(12) United States Patent
Okino et al.

(10) Patent No.: US 10,270,256 B2
(45) Date of Patent: Apr. 23, 2019

(54) POWER CONTROL APPARATUS, EQUIPMENT CONTROL APPARATUS, AND METHOD

(71) Applicant: KYOCERA Corporation, Kyoto-shi, Kyoto (JP)

(72) Inventors: Kenta Okino, Yokohama (JP); Masahiro Baba, Kawasaki (JP); Masaomi Satake, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 549 days.

(21) Appl. No.: 15/104,919

(22) PCT Filed: Dec. 16, 2014

(86) PCT No.: PCT/JP2014/083311
§ 371 (c)(1),
(2) Date: Jun. 15, 2016

(87) PCT Pub. No.: WO2015/093494
PCT Pub. Date: Jun. 25, 2015

(65) Prior Publication Data
US 2016/0322826 A1 Nov. 3, 2016

(30) Foreign Application Priority Data
Dec. 16, 2013 (JP) .................................. 2013-258892

(51) Int. Cl.
*H02J 1/10* (2006.01)
*H02J 3/38* (2006.01)
(Continued)

(52) U.S. Cl.
CPC ................ *H02J 3/383* (2013.01); *H02J 7/35* (2013.01); *H02J 13/0006* (2013.01);
(Continued)

(58) Field of Classification Search
USPC .......................................................... 307/52
See application file for complete search history.

(56) References Cited

U.S. PATENT DOCUMENTS

| | | | | |
|---|---|---|---|---|
| 6,111,767 A | * | 8/2000 | Handleman | ............... G05F 1/67 136/293 |
| 2013/0054037 A1 | * | 2/2013 | Ikawa | ....................... G05F 1/67 700/286 |

(Continued)

FOREIGN PATENT DOCUMENTS

| | | |
|---|---|---|
| JP | 2005-244615 A | 8/2005 |
| JP | 2011-097675 A | 5/2011 |

(Continued)

OTHER PUBLICATIONS

International Search Report and Written Opinion of the International Searching Authority issued by the Japanese Patent Office for International Application No. PCT/JP2014/083311.

(Continued)

*Primary Examiner* — Anh Q Tra
(74) *Attorney, Agent, or Firm* — Procopio Cory Hargreaves and Savitch LLP

(57) ABSTRACT

A power control apparatus comprises a conversion unit which is capable of collectively converting DC power output by each of the plurality of power supply apparatuses to AC; and a communication unit which communicates with an external equipment control apparatus in accordance with a predetermined communication protocol. The communication unit notifies the equipment control apparatus of an equipment class of the power control apparatus in addition to notifying the equipment control apparatus of an equipment class of each of the plurality of power supply apparatuses.

20 Claims, 7 Drawing Sheets

(51) Int. Cl.
*H02J 13/00* (2006.01)
*H02J 7/35* (2006.01)
*H02J 7/00* (2006.01)

(52) U.S. Cl.
CPC ... *H02J 13/0013* (2013.01); *H02J 2007/0096* (2013.01); *Y02E 10/563* (2013.01); *Y02E 10/566* (2013.01); *Y02E 40/72* (2013.01); *Y02E 60/7807* (2013.01); *Y02P 90/50* (2015.11); *Y04S 10/123* (2013.01); *Y04S 40/12* (2013.01)

(56) References Cited

U.S. PATENT DOCUMENTS

| | | |
|---|---|---|
| 2013/0077372 A1 | 3/2013 | Wagoner et al. |
| 2014/0046498 A1 | 2/2014 | Nakayama |
| 2014/0097695 A1* | 4/2014 | Kuwahara ............... H02J 9/06 307/81 |
| 2014/0222237 A1 | 8/2014 | Hibiya et al. |
| 2016/0164298 A1* | 6/2016 | Baba .................... G05F 1/67 307/24 |

FOREIGN PATENT DOCUMENTS

| | | |
|---|---|---|
| JP | 2012-120295 A | 6/2012 |
| JP | 2013-031243 A | 2/2013 |
| JP | 2013-090455 A | 5/2013 |
| JP | 2013-110951 A | 6/2013 |
| JP | 2013-236495 A | 11/2013 |
| WO | 2012/144629 A1 | 10/2012 |

OTHER PUBLICATIONS

Appendix Echonet Kiki Object Shosai Kitei, Release D, Echonet Consortium, Oct. 31, 2013, pp. 182-184, 199-208.

* cited by examiner

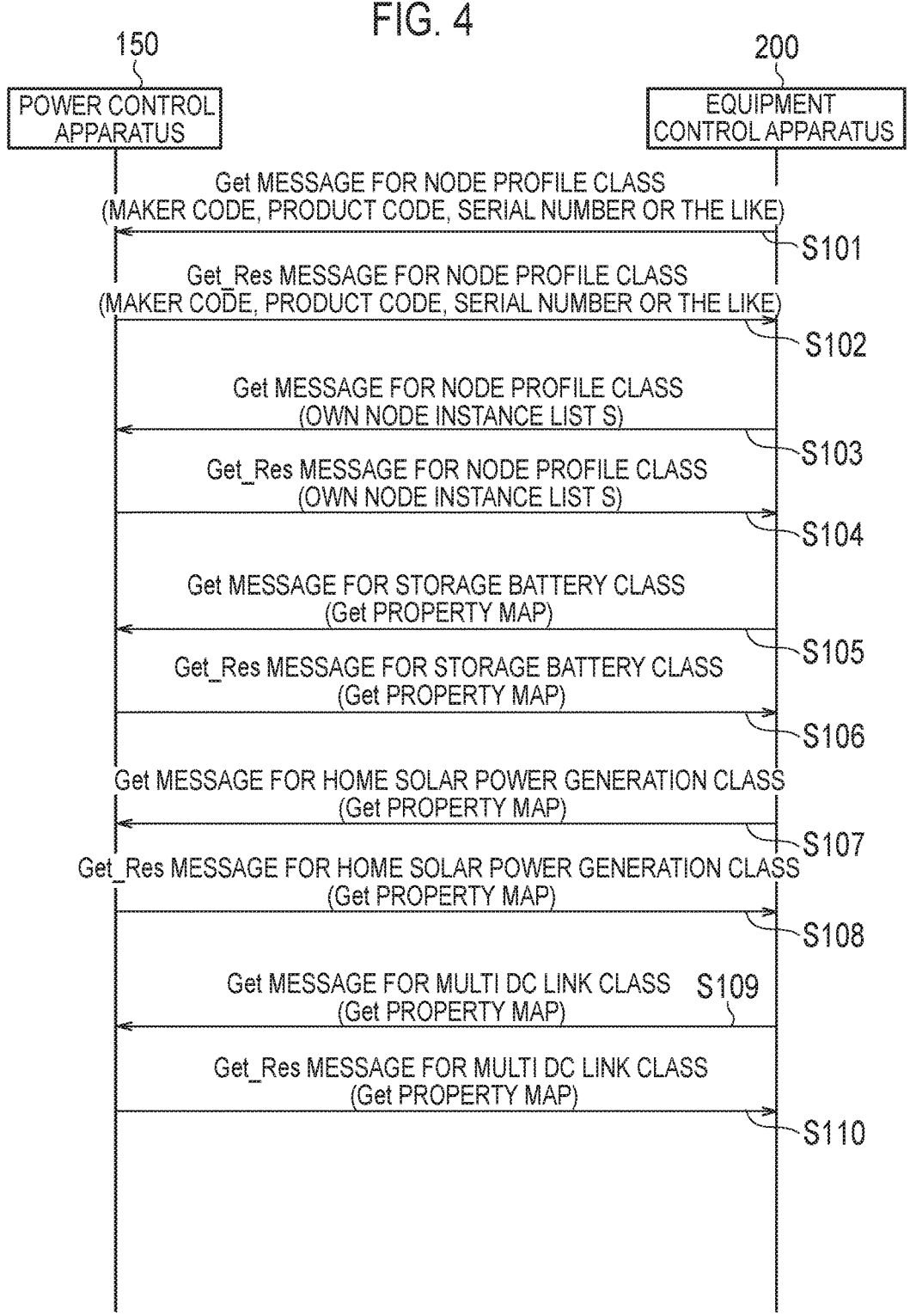

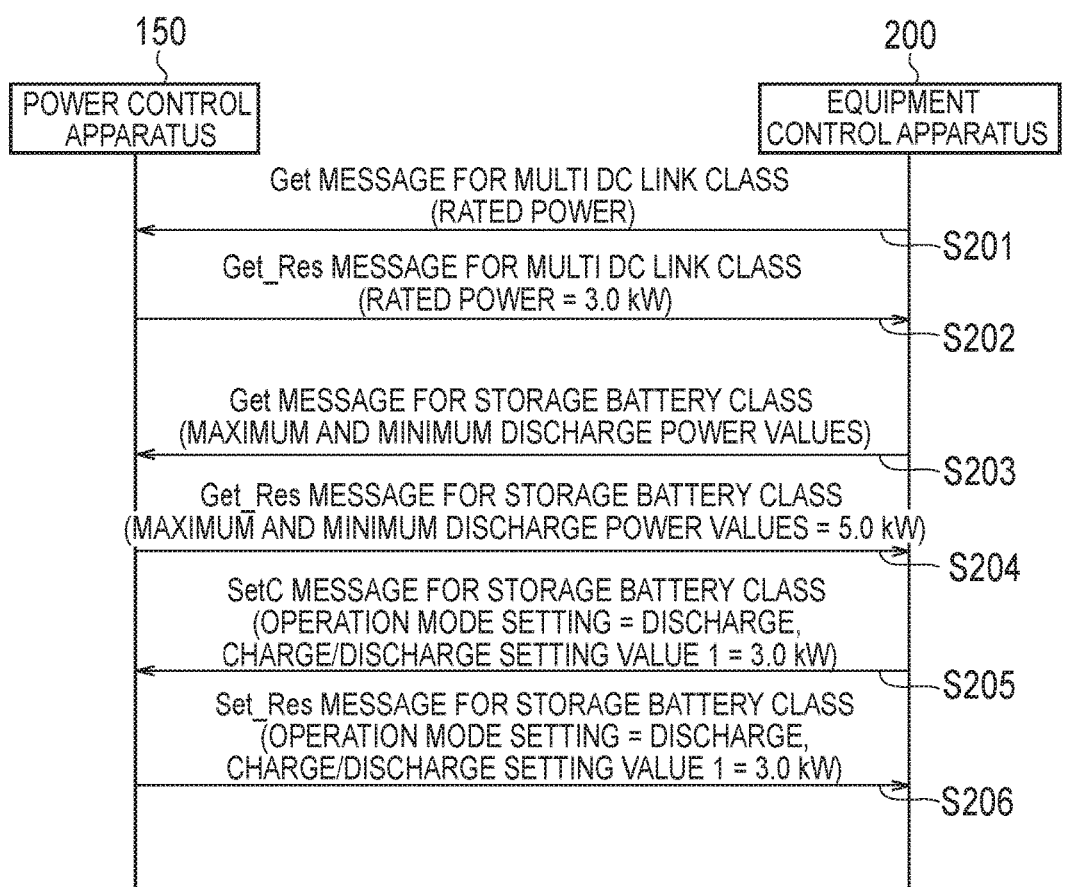

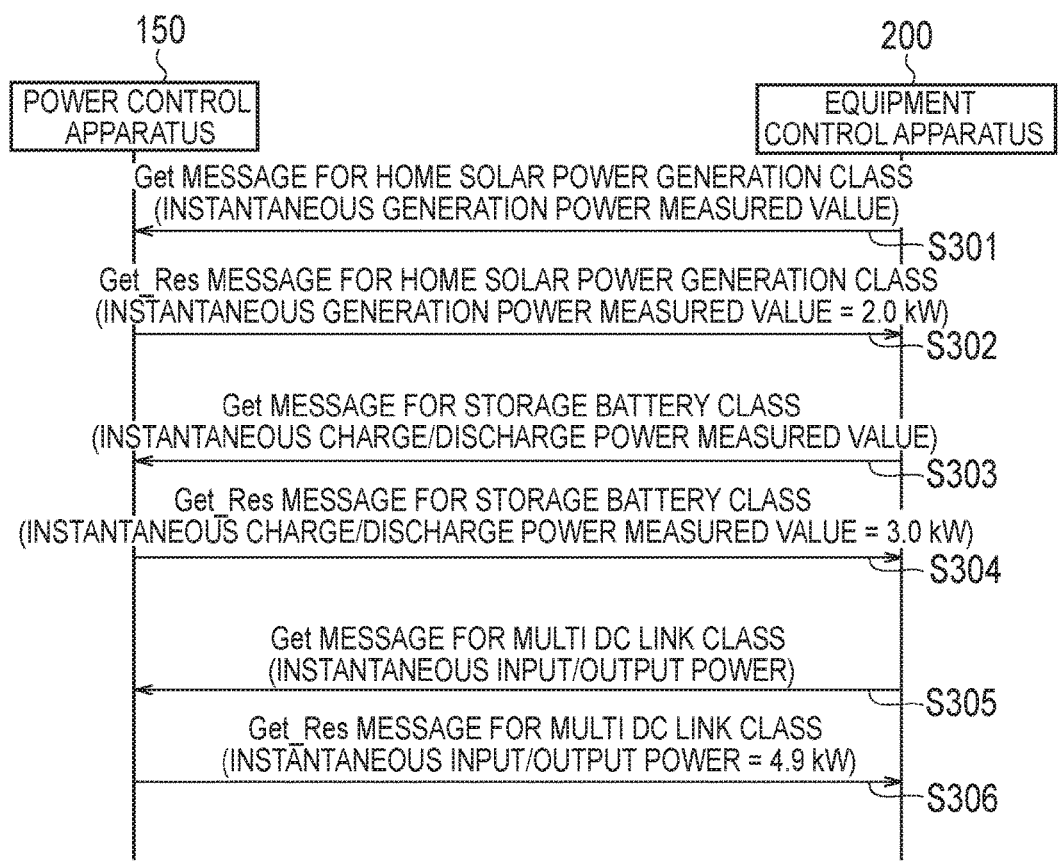

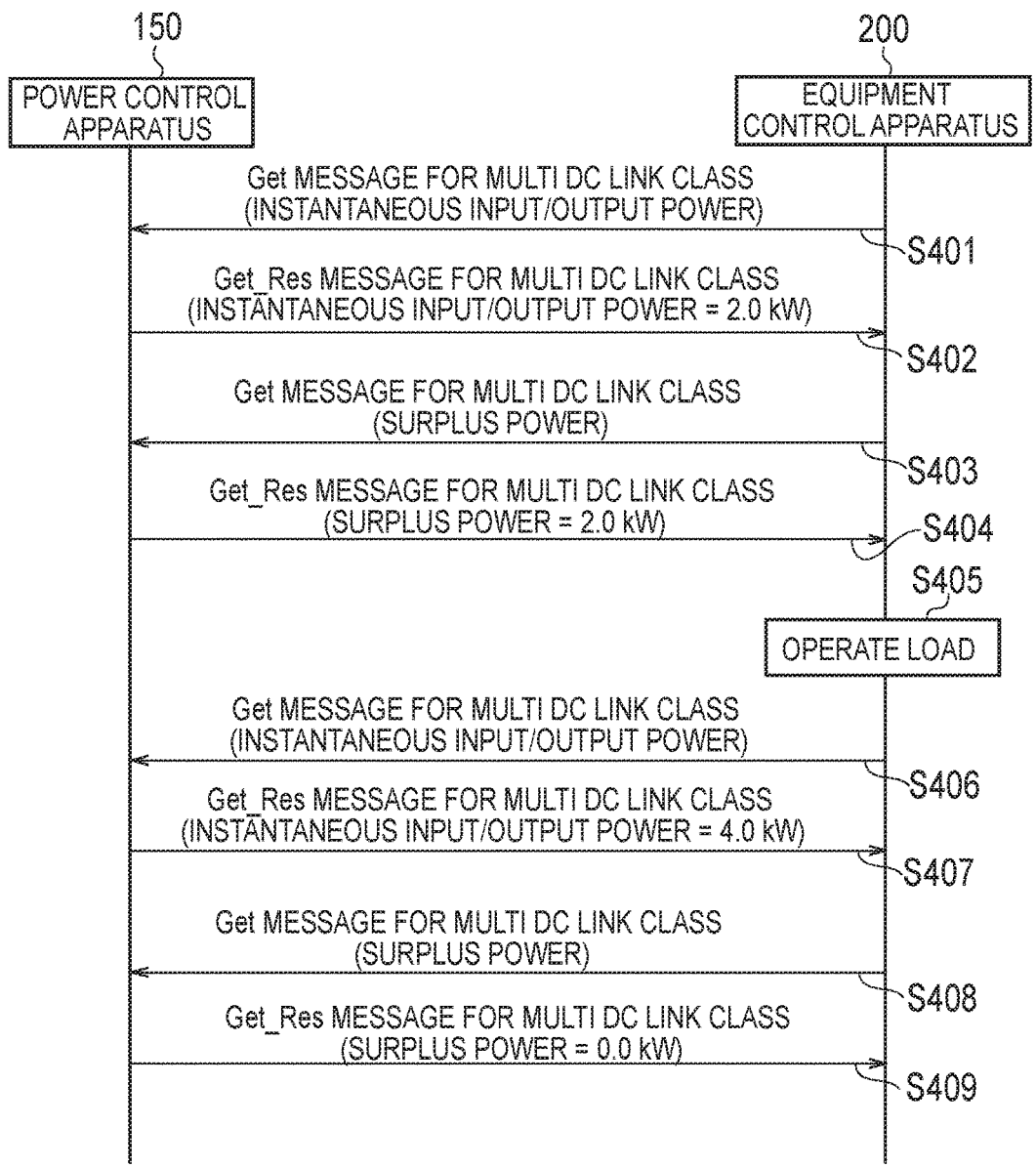

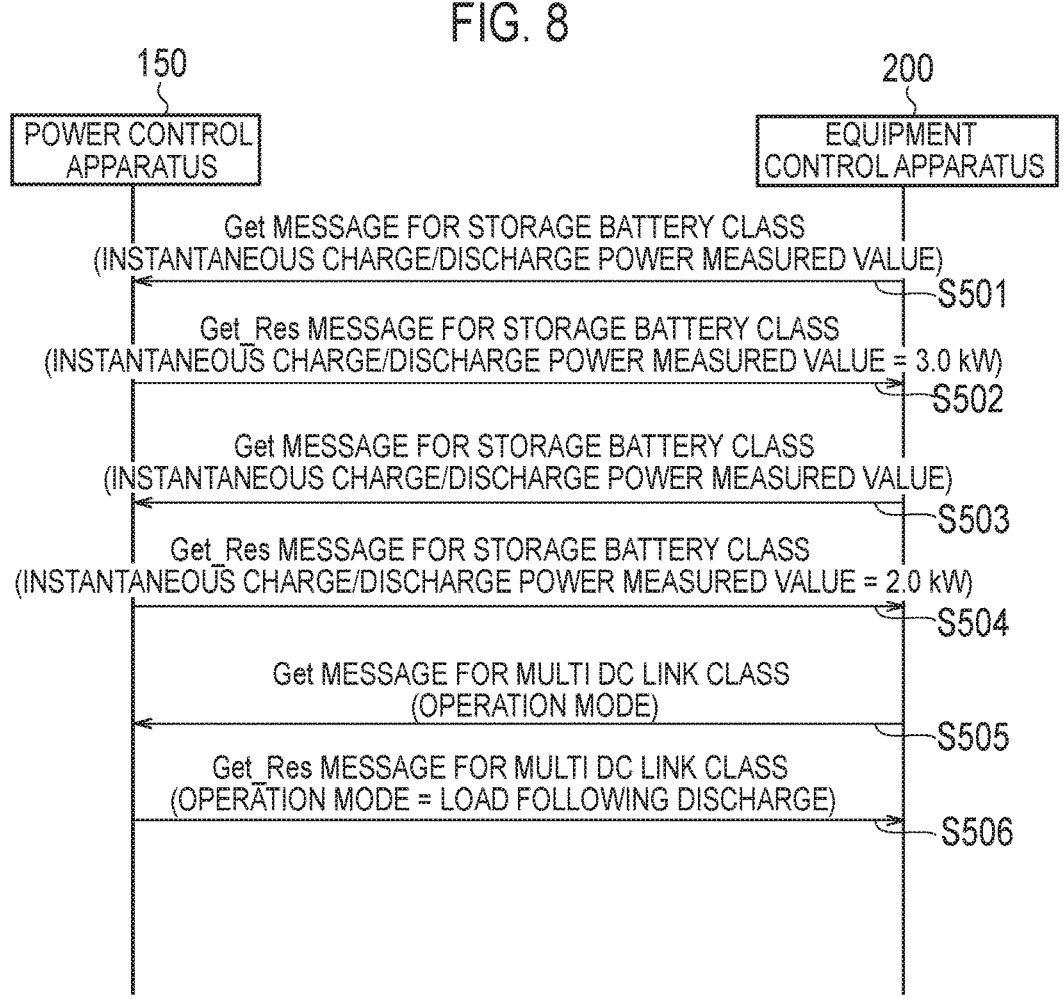

POWER CONTROL APPARATUS, EQUIPMENT CONTROL APPARATUS, AND METHOD

TECHNICAL FIELD

The present invention relates to a power control apparatus, an equipment control apparatus, and a method for performing communication according to a predetermined communication protocol.

BACKGROUND ART

In recent years, a control system (EMS: Energy Management System) including an equipment control apparatus which is installed in a power consumer's facility and controls a plurality of pieces of equipment has drawn attention. A communication protocol capable of enabling the equipment control apparatus to control the equipment provided by various makers is introduced to the system.

As one of the communication protocol, ECHONET Lite (registered trademark) defines an equipment class for every type of the equipment and defines information and control objects of the equipment as properties for every equipment class. For example, a storage battery apparatus belongs to a storage battery class, and properties corresponding to the storage battery class include a storage battery capacity, maximum and minimum charge power values, or the like (see Non Patent Literature 1).

On the other hand, a power feed system which includes a power control apparatus (power conditioner) capable of collectively converting DC power output by each of a plurality of power supply apparatuses to AC and supplies AC power to a load has been studied to be introduced. The plurality of power supply apparatuses is a solar power generation apparatus, a storage battery apparatus, a fuel cell apparatus, and the like.

The above-described power feed system is a new system using a combination of a plurality of power supply apparatuses and has features which do not exist in a system in the related art using a single power supply apparatus.

For example, a storage battery apparatus is charged in a state that DC power output by a solar power generation apparatus is maintained to be DC, so that it is possible to reduce a power conversion loss in comparison with a system in the related art which performs DC-AC conversion in a power supply apparatus.

However, since the above-described communication protocol considers only the system in the related art using a single power supply apparatus, it is difficult to perform efficient control in the case of using a combination of a plurality of power supply apparatuses.

CITATION LIST

Non Patent Literature

Non Patent Literature 1: "ECHONET SPECIFICATION APPENDIX ECHONET Equipment Object Detail Provisions Release D", Oct. 31, 2013, the Internet <URL:http://www.echonet.gr.jp/spec/pdf_spec_app_d/Spec AppendixD.pdf>

SUMMARY OF INVENTION

A power control apparatus according to a first aspect is installed in a consumers facility and controls power supply from a plurality of power supply apparatuses. The power control apparatus comprises a conversion unit which is capable of collectively converting DC power output by each of the plurality of power supply apparatuses to AC; and a communication unit which communicates with an external equipment control apparatus in accordance with a predetermined communication protocol. The communication unit notifies the equipment control apparatus of an equipment class of the power control apparatus in addition to notifying the equipment control apparatus of an equipment class of each of the plurality of power supply apparatuses.

An equipment control apparatus according to a second aspect performs control of a power control apparatus which is capable of collectively converting DC power output by each of a plurality of power supply apparatuses to AC. The equipment control apparatus comprises: a communication unit which communicates with the power control apparatus in accordance with a predetermined communication protocol; and a control unit which performs the control through the communication unit. The communication unit acquires an equipment class of the power control apparatus from the power control apparatus in addition to acquiring an equipment class of each of the plurality of power supply apparatuses from the power control apparatus.

A method according to a third aspect is used for a system including a plurality of power supply apparatuses and a power control apparatus which is capable of collectively converting DC power output by each of the plurality of power supply apparatuses to AC. The method comprises the power control apparatus and an equipment control apparatus communicating with each other in accordance with a predetermined communication protocol; and in the communication, notifying, from the power control apparatus to the equipment control apparatus, an equipment class of the power control apparatus in addition to notifying an equipment class of each of the plurality of power supply apparatuses.

BRIEF DESCRIPTION OF DRAWINGS

FIG. 4 is a sequence diagram illustrating sequence in a node connection period according to the first embodiment.

FIG. 5 is a sequence diagram illustrating operations according to the second embodiment.

FIG. 6 is a sequence diagram illustrating operations according to the third embodiment.

FIG. 7 is a sequence diagram illustrating operations according to the fourth embodiment.

FIG. 8 is a sequence diagram illustrating operations according to the fifth embodiment.

DESCRIPTION OF EMBODIMENTS

[Overview of Embodiments]

Figure 1:
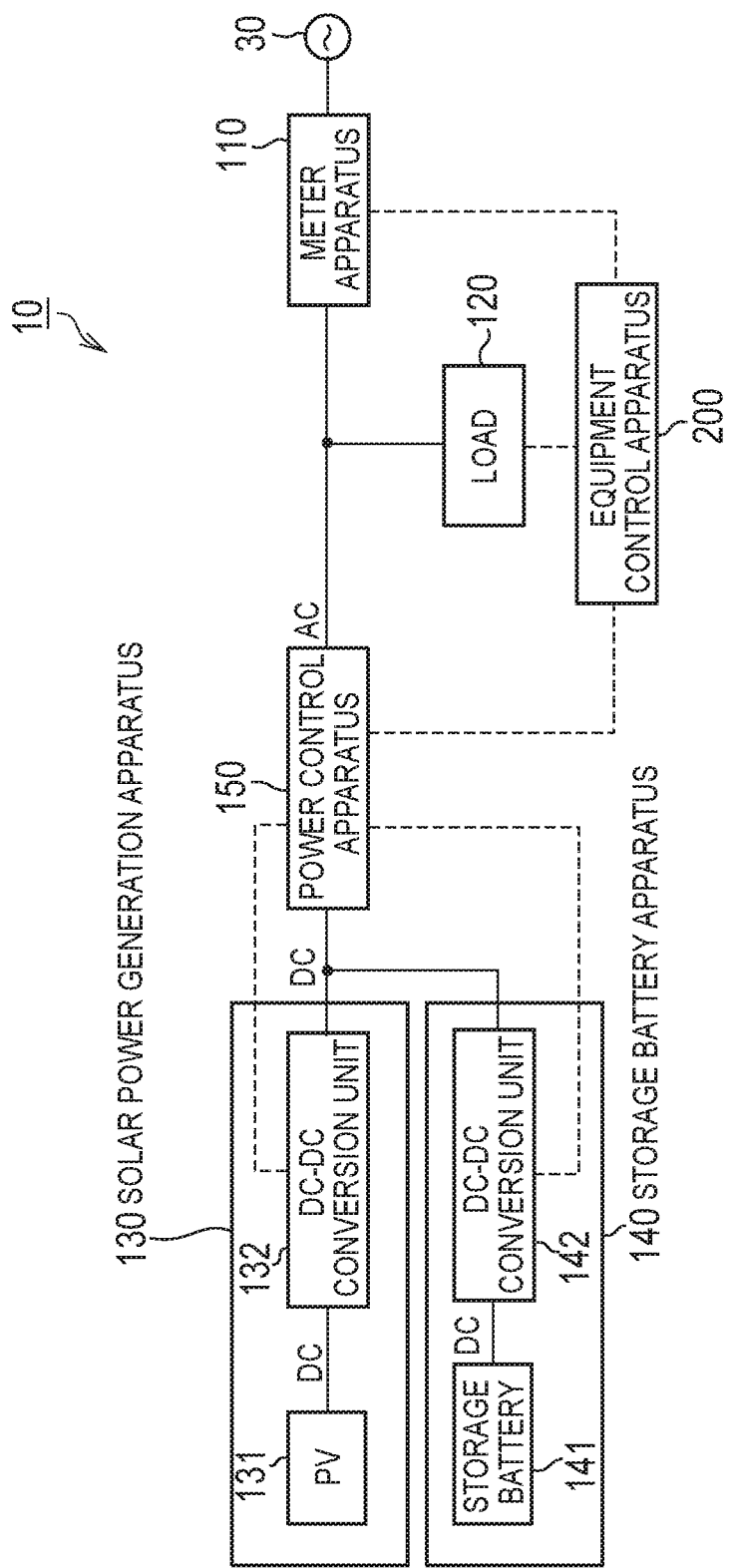
FIG. 1 is a block diagram illustrating a configuration of a control system according to first to sixth embodiments.

A power control apparatus according to a first embodiment to a sixth embodiment is installed in a consumer's facility and controls power supply from a plurality of power supply apparatuses. The power control apparatus comprises a conversion unit which is capable of collectively converting DC power output by each of the plurality of power supply apparatuses to AC; and a communication unit which communicates with an external equipment control apparatus in accordance with a predetermined communication protocol. The communication unit notifies the equipment control apparatus of an equipment class of the power control apparatus in addition to notifying the equipment control apparatus of an equipment class of each of the plurality of power supply apparatuses.

In the first embodiment, the plurality of power supply apparatuses include a predetermined power supply apparatus belonging to a predetermined equipment class which is defined so as to output AC power in the predetermined communication protocol. The communication unit is capable of notifying the equipment control apparatus of an output parameter of the predetermined power supply apparatus as a property corresponding to the predetermined equipment class. The communication unit notifies the equipment control apparatus of information indicating that the output parameter should be interpreted as a parameter for DC.

In the second embodiment, the communication unit notifies the equipment control apparatus of a rated power value of the conversion unit as a property corresponding to the equipment class of the power control apparatus.

In the second embodiment, the rated power value of the conversion unit is smaller than a sum of the rated power values of each of the plurality of power supply apparatuses.

In the second embodiment, the communication unit receives a setting request transmitted from the equipment control apparatus with respect to the notification of the rated power value. The setting request includes a power value with respect to at least one of the plurality of power supply apparatuses.

In the third embodiment, the communication unit notifies the equipment control apparatus of an instantaneous input/output value of the conversion unit as a property corresponding to the equipment class of the power control apparatus. The instantaneous input/output value is a measured value of the power after conversion in the conversion unit.

In the fourth embodiment, the plurality of power supply apparatuses include a solar power generation apparatus. The communication unit notifies the equipment control apparatus of a surplus power of the solar power generation apparatus as a property corresponding to the equipment class of the power control apparatus or as a property corresponding to the equipment class of the solar power generation apparatus.

In the fourth embodiment, the plurality of power supply apparatuses include a storage battery apparatus. The surplus power is a power which is not consumed by a load and is not charged in the storage battery apparatus among power which can be output by the solar power generation apparatus in a case where reverse flowing to a power grid is not performed.

In the fifth embodiment, the plurality of power supply apparatuses include a storage battery apparatus. The communication unit notifies the equipment control apparatus of a discharge mode of the storage battery apparatus as a property corresponding to the equipment class of the power control apparatus or as a property corresponding to the equipment class of the storage battery apparatus. The discharge mode includes a load following discharge mode for performing discharging so as to follow an increase and decrease in consumed power of a load.

In the sixth embodiment, the plurality of power supply apparatuses include a storage battery apparatus and a solar power generation apparatus. The communication unit notifies the equipment control apparatus of a charge mode of the storage battery apparatus as a property corresponding to the equipment class of the power control apparatus or as a property corresponding to the equipment class of the storage battery apparatus. The charge mode is a surplus charge mode for performing charging with only a surplus power of the solar power generation apparatus.

An equipment control apparatus according to the first to sixth embodiment performs control of a power control apparatus which is capable of collectively converting DC power output by each of a plurality of power supply apparatuses to AC. The equipment control apparatus comprises: a communication unit which communicates with the power control apparatus in accordance with a predetermined communication protocol; and a control unit which performs the control through the communication unit. The communication unit acquires an equipment class of the power control apparatus from the power control apparatus in addition to acquiring an equipment class of each of the plurality of power supply apparatuses from the power control apparatus.

In the first embodiment, the plurality of power supply apparatuses include a predetermined power supply apparatus belonging to a predetermined equipment class which is defined so as to output AC power in the predetermined communication protocol. The communication unit is capable of acquiring an output parameter of the predetermined power supply apparatus as a property corresponding to the predetermined equipment class from the power control apparatus. In response to reception of information indicating that the output parameter should be interpreted as a parameter for DC from the power control apparatus by the communication unit, the control unit interprets the output parameter acquired by the communication unit as a parameter for DC.

In a modification of the first embodiment, the plurality of power supply apparatuses include a predetermined power supply apparatus belonging to a predetermined equipment class which is defined so as to output AC power in the predetermined communication protocol. The communication unit is capable of acquiring an output parameter of the predetermined power supply apparatus as a property corresponding to the predetermined equipment class from the power control apparatus. In response to acquisition of the equipment class of the power control apparatus by the communication unit, the control unit interprets the output parameter acquired by the communication unit as a parameter for DC.

In the second embodiment, the communication unit acquires a rated power value of a conversion unit which is installed in the power control apparatus and collectively converts DC power from the plurality of power supply apparatuses to AC as a property corresponding to the equipment class of the power control apparatus from the power control apparatus. The plurality of power supply apparatuses include a predetermined power supply apparatus of which a power value is set. The control unit determines the power value of the predetermined power supply apparatus so as not to exceed the rated power value of the conversion unit. The communication unit transmits a setting request of setting the determined power value to the predetermined power supply apparatus, to the power control apparatus.

In the third embodiment, the communication unit acquires an instantaneous input/output value of a conversion unit which is installed in the power control apparatus and collectively converts DC power from the plurality of power supply apparatuses to AC as a property corresponding to the equipment class of the power control apparatus from the power control apparatus. The instantaneous input/output value is a measured value of the power after conversion in the conversion unit.

In the fourth embodiment, the plurality of power supply apparatuses includes a solar power generation apparatus. The communication unit acquires a surplus power of the solar power generation apparatus as a property corresponding to the equipment class of the power control apparatus or a property corresponding to the equipment class of the solar power generation apparatus from the power control apparatus. The control unit controls a load so as to consume the surplus power.

In the fourth embodiment, the plurality of power supply apparatuses includes a storage battery apparatus. The surplus power is a power which is not consumed by the load and is not charged in the storage battery apparatus among power output by the solar power generation apparatus in a case where reverse flowing to a power grid is not performed.

In the fifth embodiment, the plurality of power supply apparatuses includes a storage battery apparatus. The communication unit acquires a discharge mode of the storage battery apparatus as a property corresponding to the equipment class of the power control apparatus or a property corresponding to the equipment class of the storage battery apparatus from the power control apparatus. The discharge mode includes a load following discharge mode for performing discharging so as to follow an increase and decrease in consumed power of a load.

In the sixth embodiment, the plurality of power supply apparatuses includes a storage battery apparatus and a solar power generation apparatus. The communication unit acquires a charge mode of the storage battery apparatus as a property corresponding to the equipment class of the power control apparatus or a property corresponding to the equipment class of the storage battery apparatus from the power control apparatus. The charge mode includes a surplus charge mode for performing charging with only a surplus power of the solar power generation apparatus.

A method according to the first to sixth embodiment is used for a system including a plurality of power supply apparatuses and a power control apparatus which is capable of collectively converting DC power output by each of the plurality of power supply apparatuses to AC. The method comprises the power control apparatus and an equipment control apparatus communicating with each other in accordance with a predetermined communication protocol; and in the communication, notifying, from the power control apparatus to the equipment control apparatus, an equipment class of the power control apparatus in addition to notifying an equipment class of each of the plurality of power supply apparatuses.

First Embodiment

Figure 2:
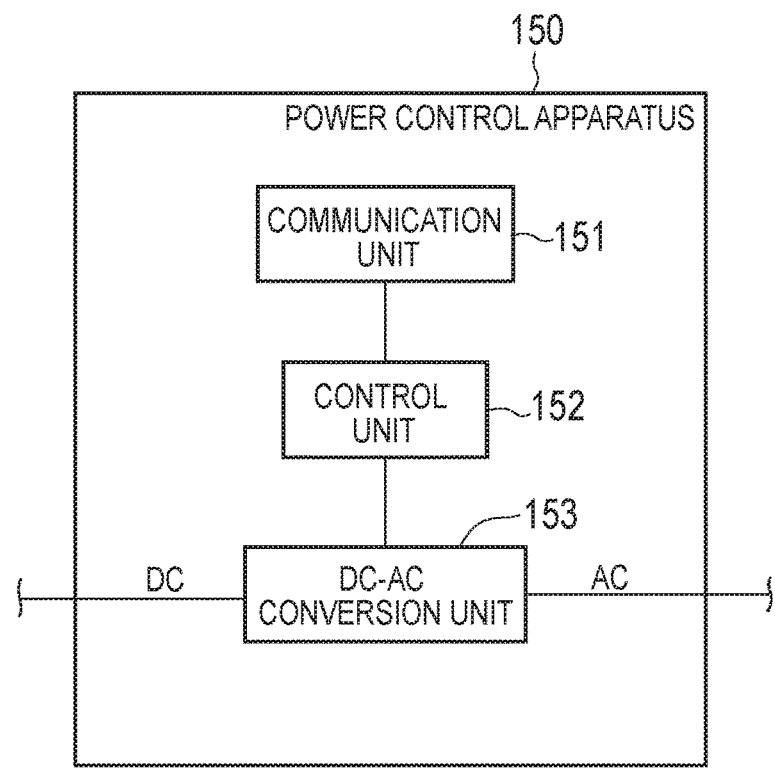
FIG. 2 is a block diagram illustrating a configuration of a power control apparatus according to the first to sixth embodiments.
Figure 3:
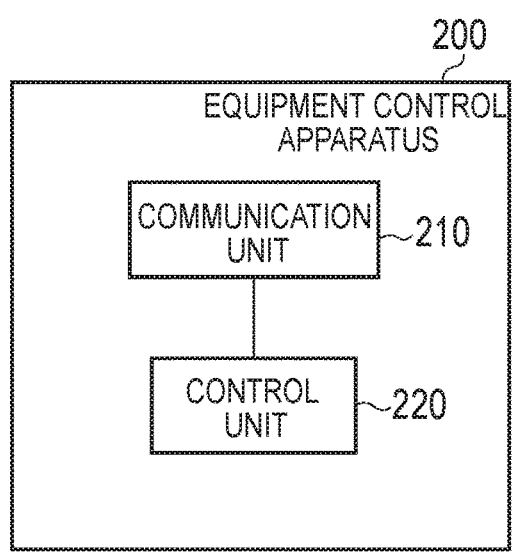
FIG. 3 is a block diagram illustrating a configuration of an equipment control apparatus according to the first to sixth embodiments.

Hereinafter, a first embodiment will be described.
(System Configuration)
FIG. 1 is a block diagram illustrating a configuration of a control system 10 according to the first embodiment. In FIG. 1, broken lines indicate signal lines, and solid lines indicate power lines. The signal lines may be wireless or wired. FIG. 2 is a block diagram illustrating a configuration of a power control apparatus 150 according to the first embodiment. FIG. 3 is a block diagram illustrating a configuration of an equipment control apparatus 200 according to the first embodiment.

As illustrated in FIG. 1, the control system 10 is installed in a consumer's facility which is supplied with power from a power distribution line 31 (power grid). The control system 10 includes a meter apparatus 110, a load 120, a plurality of power supply apparatuses (a solar power generation apparatus 130 and a storage battery apparatus 140), a power control apparatus 150, and an equipment control apparatus 200. In the first embodiment, the plurality of power supply apparatuses includes the solar power generation apparatus 130 and the storage battery apparatus 140. However, in addition to the solar power generation apparatus 130 or instead of the solar power generation apparatus 130, other power generation apparatuses (for example, a fuel cell apparatus, a gas turbine power generation apparatus) may be used.

The meter apparatus 110 is equipment which measures a grid power (purchasing power) supplied from the power distribution line 31 through the power lines. The meter apparatus 110 may measure a power (selling power) supplied from the power control apparatus 150 through the power lines. The meter apparatus 110 notifies a measured value to the equipment control apparatus 200 through the signal lines. The meter apparatus 110 communicates with the equipment control apparatus 200 through the signal lines. The meter apparatus 110 acquires various types of information via an external network such as a public network. The various types of information are a unit price of purchasing electricity and a unit price of selling electricity for every time zone and the like. The meter apparatus 110 is referred to as a smart meter. The meter apparatus 110 notifies the various types of information acquired via the external network to the equipment control apparatus 200 through the signal line.

The load 120 is equipment which consumes a power supplied from at least any one of the power distribution line 31 and the power control apparatus 150 through the power line. For example, the load 120 is a refrigerator, an illumination, an air-conditioner, a TV set, or the like. The load 120 may include single equipment or a plurality of pieces of equipment. The load 120 communicates with the equipment control apparatus 200 through the signal line.

The solar power generation apparatus 130 is equipment which performs power generation and includes a PV (photovoltaics) 131 and a DC-DC conversion unit 132. The PV 131 generates a power according to reception of solar energy and outputs the generated DC power. The DC-DC conversion unit 132 steps up or steps down the DC power output from the PV 131 and outputs the DC power (generation power) through the power lines. In addition, the DC-DC conversion unit 132 communicates with the power control apparatus 150 through the signal line.

The storage battery apparatus 140 is equipment which stores a power. The storage battery apparatus 140 is charged with at least one of a grid power supplied from the power distribution line 31 through the power control apparatus 150 and a generation power supplied from the solar power generation apparatus 130. The storage battery apparatus 140 includes a storage battery 141 and a DC-DC conversion unit 142. The storage battery 141 performs storing (charging) of a power and supplying (discharging) of a power. In a charging period of the storage battery 141, the DC-DC conversion unit 142 steps up or steps down the DC power supplied through the power line and outputs the DC power to the storage battery 141. In a discharging period of the storage battery 141, the DC-DC conversion unit 142 steps up or steps down the DC power output from the storage battery 141 and outputs DC power (discharge power) through the power line. In addition, the DC-DC conversion unit 142 communicates with the power control apparatus 150 through the signal line.

The power line extending from the solar power generation apparatus 130 is electrically connected to the power line extending from the storage battery apparatus 140, and the connected power lines are connected to the power control apparatus 150. The power lines transmit the DC power.

The power control apparatus 150 is equipment which controls power supply from the solar power generation apparatus 130 and the storage battery apparatus 140. As illustrated in FIG. 2, the power control apparatus 150 includes a communication unit 151, a control unit 152, and a DC-AC conversion unit 153. The communication unit 151 communicates with the solar power generation apparatus 130, the storage battery apparatus 140, and the equipment control apparatus 200 through the signal lines. The control unit 152 controls the solar power generation apparatus 130 and the storage battery apparatus 140 through the communication. In addition, the control unit 152 controls the DC-AC conversion unit 153. The DC-AC conversion unit 153 collectively converts each of the DC power output from the solar power generation apparatus 130 and the DC power output from the storage battery apparatus 140 into AC power. In addition, the DC-AC conversion unit 153 may convert AC power (grid power) supplied from the power distribution line 31 into DC power.

The power control apparatus 150 constitutes a power feed system which collectively converts the DC power output from each of a plurality of power supply apparatuses to the AC power and supplies the AC power to the load 120. Hereinafter, this power feed system is referred to as a "multi DC link system". The multi DC link system is a new system using a combination of a plurality of the power supply apparatuses, and a system using a single power supply apparatus in the related art does not have this feature. For example, in the state where the DC power output by the solar power generation apparatus 130 is maintained to be DC, the storage battery apparatus 140 is charged with the DC power, so that a DC-AC conversion loss does not occur.

The equipment control apparatus 200 controls a plurality of pieces of equipment installed in the consumer's facility. The equipment control apparatus 200 is, for example, an HEMS (Home Energy Management System) which controls a plurality of pieces of equipment installed in home. As illustrated in FIG. 3, the equipment control apparatus 200 is configured to include a communication unit 210 and a control unit 220. The communication unit 210 communicates with the meter apparatus 110, the load 120, and the power control apparatus 150 through the signal lines. The control unit 220 controls the load 120 and the power control apparatus 150 based on information acquired from, for example, the meter apparatus 110 by the communication unit 210. The communication unit 151 of the power control apparatus 150 and the communication unit 210 of the equipment control apparatus 200 communicate with each other according to a predetermined communication protocol.

(Communication Protocol)

In the first embodiment, the predetermined communication is protocol ECHONET Lite (registered trademark).

A protocol stack of equipment (referred to as "nodes") in accordance with the ECHONET Lite (registered trademark) is divided into three portions of a lower communication layer, communication middleware, and application software. In the OSI reference model, the lower communication layer corresponds to the first to fourth layers, the communication middleware corresponds to the fifth and sixth layers; and the application software corresponds to the seventh layer. In the ECHONET Lite (registered trademark), the specification of the communication middleware is defined, but the specification of the lower communication layer is not defined.

In the first embodiment, each of the communication unit 151 of the power control apparatus 150 and the communication unit 210 of the equipment control apparatus 200 perform functions of the lower communication layer and the communication middleware. In addition, each of the control unit 152 of the power control apparatus 150 and the control unit 220 of the equipment control apparatus 200 perform functions of the application software.

In addition, in the ECHONET Lite (registered trademark), an equipment class (referred to as an "equipment object") is defined for every type of the equipment, and parameters about the equipment are defined as properties for each equipment class. For example, the solar power generation apparatus 130 belongs to a "home solar power generation class", and the storage battery apparatus 140 belong to a "storage battery class". In addition, properties corresponding to the storage battery class include a storage battery capacity, maximum and minimum charge power values, and the like. In the first embodiment, a "multi DC link class" is newly defined as an equipment class of the power control apparatus 150.

The communication unit 151 of the power control apparatus 150 manages properties about the solar power generation apparatus 130 (home solar power generation class), properties about the storage battery apparatus 140 (storage battery class), and properties about the power control apparatus 150 (multi DC link class). Information managed for every equipment class in this manner is referred to as an "instance". In addition, the communication unit 151 of the power control apparatus 150 manages attribute information (for example, maker code, product code, and serial number) of the power control apparatus 150 as a "node profile (profile object)".

Messages which are transmitted/received by the communication middleware include, for example, "source object identification code", "destination object identification code", "service identification code", "property identification code", "property value", and the like. The source object identification code is information for identifying an object of a source. The destination object identification code is information for identifying an object of a destination (equipment class identification code). The service identification code is information for identifying a content of manipulation of an associated property value. The service identification code is, for example, a property value setting request "Set", a property value reading request "Get", or the like. The property identification code is information for identifying a property.

(Operations According to First Embodiment)

Next, operations according to the first embodiment will be described.

(1) Sequence in Node Connection Period

FIG. 4 is a sequence diagram illustrating a sequence in a node connection period according to the first embodiment. The sequence in the node connection period starts, for example, when the equipment control apparatus 200 is activated. The messages illustrated in FIG. 4 are messages that the communication unit 151 of the power control apparatus 150 and the communication unit 210 of the equipment control apparatus 200 transmits and receives.

As illustrated in FIG. 4, in step S101, the equipment control apparatus 200 transmits a reading request (hereinafter, referred to as a "Get message") for request to read a main node profile (maker code, product code, serial number, and the like) to the power control apparatus 150.

In step S102, according to the reception of the Get message, the power control apparatus 150 transmits a reading response (hereinafter, referred to as a "Get Res message") of notifying the main node profile to the equipment control apparatus 200. The equipment control apparatus 200 acquires the main node profile from the Get Res message to detect a node. However, at this time, an instance managed by the node is unknown.

In step S103, the equipment control apparatus 200 transmits to the detected node (power control apparatus 150) a Get message of requesting to read an instant list that is a table of instances managed by the node.

In step S104, according to the reception of the Get message, the power control apparatus 150 transmits a Get Res message of notifying an instance list of its own node to the equipment control apparatus 200. The instance list includes instances of the home solar power generation class, instances of the storage battery class, and instances of the multi DC link class. In other words, the power control apparatus 150 notifies the equipment class of the power control apparatus 150 to the equipment control apparatus 200 in addition to notifying the equipment class of each of the solar power generation apparatus 130 and the equipment class of the storage battery apparatus 140 to the equipment control apparatus 200.

The equipment control apparatus 200 acquires the instance list from the Get Res message. In other words, the equipment control apparatus 200 acquires the equipment class of the power control apparatus 150 from the power control apparatus 150 in addition to acquiring the equipment class of each of the solar power generation apparatus 130 and the equipment class of the storage battery apparatus 140 from the power control apparatus 150. Accordingly, the equipment control apparatus 200 checks that the detected node (power control apparatus 150) manages the instances of the home solar power generation class and the instances of each of the storage battery class and the instances of the multi DC link class.

In step S105, the equipment control apparatus 200 transmits a Get message of request to read a property map of the instances of the storage battery class to the power control apparatus 150. The property map is a table of properties included in the associated instances.

In step S106, according to the reception of the Get message, the power control apparatus 150 transmits a Get Res message of notifying the property map of the instances of the storage battery class to the equipment control apparatus 200. The equipment control apparatus 200 acquires a property map of the instances of the storage battery class by the Get Res message. As a property included in the instances of the storage battery class, there are, for example, an operation state, operation mode settings, an instantaneous charge/discharge power measured value, a residual amount of storage, and a storage battery type.

In step S107, the equipment control apparatus 200 transmits a Get message of request to read the property map of the instances of the home solar power generation class to the power control apparatus 150.

In step S108, according to the reception of the Get message, the power control apparatus 150 transmits a Get Res message of notifying the property map of the instances of the home solar power generation class to the equipment control apparatus 200. The equipment control apparatus 200 acquires the property map of the instances of the home solar power generation class from the Get Res message. As properties of the instances of the home solar power generation class, there are, for example, an operation state, an instantaneous generation power measured value, an accumulated generation power measured value, and the like.

In step S109, the equipment control apparatus 200 transmits a Get message of request to read a property map of the instances of the multi DC link class to the power control apparatus 150.

In step S110, according to the reception of the Get message, the power control apparatus 150 transmits a Get Res message of notifying the property map of the instances of the multi DC link class to the equipment control apparatus 200. The equipment control apparatus 200 acquires the property map of the instances of the multi DC link class from the Get Res message. A specific example of properties included in the instances of the multi DC link class will be described.

(2) AC-DC Interpreting Operation

When the above-described sequence in the node connection period is completed, the equipment control apparatus 200 checks the properties included in the instances managed by the power control apparatus 150, and the equipment control apparatus 200 is in a state where the equipment control apparatus can control the power control apparatus 150.

In the control, the communication unit 151 of the power control apparatus 150 can notify an output parameter of the solar power generation apparatus 130 as a property corresponding to the home solar power generation class to the equipment control apparatus 200. In addition, the communication unit can notify the output parameter of the storage battery apparatus 140 as a property corresponding to the storage battery class to the equipment control apparatus 200.

However, since the ECHONET Lite (registered trademark) considers a system in the related art using a single power supply apparatus, it is defined that the output parameters treated in the home solar power generation class and the storage battery class are AC. The output parameter is a current value, a voltage value, or a power value. Actually, since the output parameter treated by the solar power generation apparatus 130 and the output parameter treated by the storage battery apparatus 140 according to the first embodiment are not AC but DC, in order that the equipment control apparatus 200 accurately checks the output parameters, the output parameters need to be interpreted as parameters for DC.

Accordingly, in the first embodiment, the communication unit 151 of the power control apparatus 150 notifies information (hereinafter, referred to as a "DC read-changing flag") indicating that the output parameter needs to be interpreted as parameters for DC to the equipment control apparatus 200. The DC read-changing flag is included in the property corresponding to the multi DC link class. The communication unit 210 of the equipment control apparatus 200 acquires the DC read-changing flag from the power control apparatus 150. According to the acquisition of the DC read-changing flag, the control unit 220 of the equipment control apparatus 200 interprets the output parameters acquired from the power control apparatus 150 by the communication unit 210 as parameters for DC.

(Summary of First Embodiment)

As described above, in the first embodiment, the communication unit 151 of the power control apparatus 150 notifies the equipment class of the power control apparatus 150 to the equipment control apparatus 200 in addition to notifying the equipment class of each of the solar power generation apparatus 130 and the equipment class of the storage battery apparatus 140 to the equipment control apparatus 200.

In addition, the communication unit 210 of the equipment control apparatus 200 acquires the equipment class of the power control apparatus 150 from the power control apparatus 150 in addition to acquiring the equipment class of each of the solar power generation apparatus 130 and the equipment class of the storage battery apparatus 140 from the power control apparatus 150.

Accordingly, it is possible to implement efficient control even in the case where a new system (multi DC link system) using a combination of a plurality of the power supply apparatuses is introduced.

In the first embodiment, the communication unit 210 of the equipment control apparatus 200 acquires the DC read-changing flag as a property corresponding to the multi DC link class from the power control apparatus 150. According to the acquisition of the DC read-changing flag, the control unit 220 of the equipment control apparatus 200 interprets the output parameters of each of the solar power generation apparatus 130 and the storage battery apparatus 140 as parameters for DC.

Accordingly, since the control unit 220 of the equipment control apparatus 200 can accurately check the output parameters, it is possible to implement control that is more efficient.

Modified Example of First Embodiment

Instead of explicitly notifying the DC read-changing flag, the equipment control apparatus 200 may perform AC-DC read-changing according to the notification of the multi DC link class.

In the modified example of the first embodiment, the communication unit 210 of the equipment control apparatus 200 acquires the multi DC link class from the power control apparatus 150. According to the acquisition of the multi DC link class by the communication unit 210, the control unit 220 of the equipment control apparatus 200 interprets the output parameter of each of the solar power generation apparatus 130 and the output parameter of the storage battery apparatus 140 as parameters for DC.

Accordingly, in the modified example of the first embodiment, the notification of the DC read-changing flag may be made unnecessary.

Second Embodiment

Hereinafter, a difference of a second embodiment from the first embodiment will be described. The second embodiment is the same as the first embodiment in terms of a system configuration.

In the second embodiment, for example, due to an electricity bill system or the like, the case where the rated power value of the DC-AC conversion unit 153 of the power control apparatus 150 is set to be small is considered. In this case, the rated power value of the DC-AC conversion unit 153 is smaller than a sum of the rated power value of each of the solar power generation apparatus 130 and the rated power value of the storage battery apparatus 140. For example, the rated power value of the DC-AC conversion unit 153 is smaller than a rated power value of the storage battery apparatus 140.

(Operations According to Second Embodiment)

In the second embodiment, the communication unit 151 of the power control apparatus 150 notifies the rated power value of the DC-AC conversion unit 153 as a property corresponding to the multi DC link class to the equipment control apparatus 200.

The communication unit 210 of the equipment control apparatus 200 acquires the rated power value of the DC-AC conversion unit 153 from the power control apparatus 150. The control unit 220 of the equipment control apparatus 200 determines a discharge value of the storage battery apparatus 140 so as not to exceed the rated power value of the DC-AC conversion unit 153. The communication unit 210 of the equipment control apparatus 200 transmits a setting request (Set message) of setting the determined discharge value to the power control apparatus 150.

The communication unit 151 of the power control apparatus 150 receives the Set message transmitted from the equipment control apparatus 200 with respect to the notification of the rated power value of the DC-AC conversion unit 153. The Set message includes the discharge value of the storage battery apparatus 140. The control unit 220 of the power control apparatus 150 controls the storage battery apparatus 140 to perform discharging with the discharge value.

FIG. 5 is a sequence diagram illustrating operations according to the second embodiment.

As illustrated in FIG. 5, in step S201, the equipment control apparatus 200 transmits a Get message of requesting to read the rated power value of the DC-AC conversion unit 153 to the power control apparatus 150. The rated power value of the DC-AC conversion unit 153 is a property corresponding to the multi DC link class.

In step S202, according to the reception of the Get message, the power control apparatus 150 transmits a Get Res message of notifying the rated power value of the DC-AC conversion unit 153 to the equipment control apparatus 200. Here, it is assumed that the rated power value of the DC-AC conversion unit 153 is 3.0 kW.

In step S203, the equipment control apparatus 200 transmits a Get message of requesting to read maximum and minimum discharge values of the storage battery apparatus 140 to the power control apparatus 150. The maximum and minimum discharge values of the storage battery apparatus 140 are properties corresponding to the storage battery class represent maximum and minimum values of the discharge power of the storage battery apparatus 140, respectively.

In step S204, according to the reception of the Get message, the power control apparatus 150 transmits a Get Res message of notifying the maximum and minimum discharge values of the storage battery apparatus 140 to the equipment control apparatus 200. Here, it is assumed that the maximum value of the discharge power of the storage battery apparatus 140 is 5.0 kW.

Since the maximum value of the discharge power of the storage battery apparatus 140 is larger than the rated power value of the DC-AC conversion unit 153, the power control apparatus 150 determines the discharge value of the storage battery apparatus 140 so as not to exceed the rated power value of the DC-AC conversion unit 153. Here, it is assumed that the discharge value of the storage battery apparatus 140 is determined to be 3.0 kW.

In step S205, the equipment control apparatus 200 transmits a SetC message of request to set the operation mode setting "discharge" and the discharge setting value "3.0 kW" to the power control apparatus 150. The SetC message indicates a Set message requiring a response.

According to the reception of the SetC message, the power control apparatus 150 set the operation mode setting to "discharge" and the discharge setting value to "3.0 kW" and controls the storage battery apparatus 140 so as to discharge with 3.0 kW.

In step S206, the power control apparatus 150 transmits a Set Res message of notifying the operation mode setting "discharge" and the discharge setting value "3.0 kW" to the equipment control apparatus 200.

(Summary of Second Embodiment)

As described above, in the second embodiment, the communication unit 151 of the power control apparatus 150 notifies the rated power value of the DC-AC conversion unit 153 as a property corresponding to the multi DC link class to the equipment control apparatus 200. The communication unit 210 of the equipment control apparatus 200 acquires the rated power value of the DC-AC conversion unit 153 from the power control apparatus 150.

Accordingly, for example, it is possible to implement efficient control even in the case where the rated power value of the DC-AC conversion unit 153 is smaller than the rated power value of the storage battery apparatus 140, since the discharge value of the storage battery apparatus 140 can be controlled so as not to exceed the rated power value of the DC-AC conversion unit 153.

Third Embodiment

Hereinafter, a difference of a third embodiment from the first embodiment will be described. The third embodiment is the same as the first embodiment in terms of a system configuration.

When the DC-AC conversion unit 153 of the power control apparatus 150 collectively converts the power of each of the solar power generation apparatus 130 and the power of the storage battery apparatus 140 to AC, a DC-AC conversion loss occurs.

Therefore, it is difficult to perform efficient control when the equipment control apparatus 200 acquires the power value of each of the solar power generation apparatus 130 and the power value of the storage battery apparatus 140 and uses the sum of the power values as the output value of the power control apparatus 150 to the control, due to an error corresponding to the DC-AC conversion loss.

(Operation According to Third Embodiment)

In the third embodiment, the control unit 152 of the power control apparatus 150 measures an instantaneous power value after DC-AC conversion of the DC-AC conversion unit 153 as instantaneous input/output value. The communication unit 151 of the power control apparatus 150 notifies instantaneous input/output value of the DC-AC conversion unit 153 as a property corresponding to the multi DC link class to the equipment control apparatus 200.

The communication unit 210 of the equipment control apparatus 200 acquires the instantaneous input/output value of the DC-AC conversion unit 153 from the power control apparatus 150. The instantaneous input/output value is a measured value of the power after the conversion of the DC-AC conversion unit 153. The control unit 220 of the equipment control apparatus 200 uses not a sum of the power value of each of the solar power generation apparatus 130 and the power value of the storage battery apparatus 140 but an instantaneous input/output value of the DC-AC conversion unit 153 as the output value of the power control apparatus 150.

FIG. 6 is a sequence diagram illustrating operations according to the third embodiment.

As illustrated in FIG. 6, in step S301, the equipment control apparatus 200 transmits a Get message of requesting to read the instantaneous generation power measured value of the solar power generation apparatus 130 to the power control apparatus 150. The instantaneous generation power measured value is a property corresponding to the home solar power generation class.

In step S302, according to the reception of the Get message, the power control apparatus 150 transmits a Get Res message of notifying the instantaneous generation power measured value of the solar power generation apparatus 130 to the equipment control apparatus 200. Here, it is assumed that the instantaneous generation power measured value is 2.0 kW.

In step S303, the equipment control apparatus 200 transmits a Get message of request to read an instantaneous charge/discharge power measured value of the storage battery apparatus 140 to the power control apparatus 150. The instantaneous charge/discharge power measured value is a property corresponding to the home solar power generation class. Here, it is assumed that the operation mode setting of the storage battery apparatus 140 is "discharge".

In step S304, according to the reception of the Get message, the power control apparatus 150 transmits a Get Res message of notifying the instantaneous charge/discharge power measured value of the storage battery apparatus 140 to the equipment control apparatus 200. Here, it is assumed that the instantaneous charge/discharge power measured value is 3.0 kW.

In step S305, the equipment control apparatus 200 transmits a Get message of requesting to read the instantaneous input/output value of the DC-AC conversion unit 153 to the power control apparatus 150. The instantaneous input/output value of the DC-AC conversion unit 153 is a property corresponding to the multi DC link class.

In step S306, according to the reception of the Get message, the power control apparatus 150 transmits a Get Res message of notifying the instantaneous input/output value of the DC-AC conversion unit 153 to the equipment control apparatus 200. Here, it is assumed that the instantaneous input/output value of the DC-AC conversion unit 153 is 4.9 kW. In this manner, the sum of the instantaneous generation power measured value (2.0 kW) of the solar power generation apparatus 130 and the instantaneous charge/discharge power measured value (3.0 kW) of the storage battery apparatus 140 is 5.0 kW, but the instantaneous input/output value of the DC-AC conversion unit 153 is 4.9 kW. Namely, it can be understood that the DC-AC conversion loss of 0.1 kW occurs.

(Summary of Third Embodiment)

As described above, in the third embodiment, the communication unit 151 of the power control apparatus 150 notifies the instantaneous input/output value of the DC-AC conversion unit 153 as a property corresponding to the multi DC link class to the equipment control apparatus 200. The communication unit 210 of the equipment control apparatus 200 acquires the instantaneous input/output value of the DC-AC conversion unit 153 from the power control apparatus 150.

Accordingly, it is possible to implement efficient control since the equipment control apparatus 200 can accurately check the output value of the power control apparatus 150.

Fourth Embodiment

Hereinafter, a difference of a fourth embodiment from the first embodiment will be described. The fourth embodiment is the same as the first embodiment in terms of a system configuration.

In the fourth embodiment, the case where the output of the power control apparatus 150 is not reversely flowed to the power distribution line 31 (power grid) is considered. In this case, if the instantaneous generation power of the solar power generation apparatus 130 is larger than the consumed power of the load 120 and the storage battery apparatus 140 is in a fully charged state, surplus power occurs in the solar power generation apparatus 130.

(Operations According to Fourth Embodiment)

In the fourth embodiment, the control unit 152 of the power control apparatus 150 detects the surplus power of the solar power generation apparatus 130. The surplus power is a power which is not consumed by the load 120 and is not charged in the storage battery apparatus 140 among the generation power of the solar power generation apparatus 130 in the case where the reverse flowing to the power grid is not performed. For example, in general, the solar power generation apparatus 130 is operated to secure a maximum generation power under the control of an MPPT and has a function of stopping the MPPT control to decrease the output power in the case where the maximum generation power is not needed. Here, a difference between an originally generatable power value and an intentionally decreased power is a so-called restricted power, and if the MPPT control is being performed, the difference becomes a power which is in excess (surplus power). Accordingly, the surplus power can be calculated by a difference of the power of the solar power generation apparatus 130 between the time when the MPPT control is performed and the time when the MPPT control is not performed. The communication unit 151 of the power control apparatus 150 notifies the surplus power of the solar power generation apparatus 130 as a property corresponding to the multi DC link class to the equipment control apparatus 200.

The communication unit 210 of the equipment control apparatus 200 requires the surplus power of the solar power generation apparatus 130 from the power control apparatus 150. The control unit 220 of the equipment control apparatus 200 controls the load 120 to consume the surplus power of the solar power generation apparatus 130. More specifically, by increasing the consumed power of the load 120 by activating the load 120 (for example, an air-conditioner, a heat storage apparatus, and the like) or the like, it is possible to perform efficient control without waste.

FIG. 7 is a sequence diagram illustrating operations according to the fourth embodiment.

As illustrated in FIG. 7, in step S401, the equipment control apparatus 200 transmits a Get message of requesting to read the instantaneous input/output value of the DC-AC conversion unit 153 to the power control apparatus 150. The instantaneous input/output value of the DC-AC conversion unit 153 is a property corresponding to the multi DC link class.

In step S402, according to the reception of the Get message, the power control apparatus 150 transmits a Get Res message of notifying the instantaneous input/output value of the DC-AC conversion unit 153 to the equipment control apparatus 200. Here, it is assumed that the instantaneous input/output value of the DC-AC conversion unit 153 is 2.0 kW.

In step S403, the equipment control apparatus 200 transmits a Get message of requesting to read the surplus power of the solar power generation apparatus 130 to the power control apparatus 150. The surplus power of the solar power generation apparatus 130 is a property corresponding to the multi DC link class.

In step S404, according to the reception of the Get message, the power control apparatus 150 transmits a Get Res message of notifying the surplus power of the solar power generation apparatus 130 to the equipment control apparatus 200. Here, it is assumed that the surplus power of the solar power generation apparatus 130 is 2.0 kW.

In step S405, the equipment control apparatus 200 controls the load 120 to consume the surplus power of the solar power generation apparatus 130.

In step S406, the equipment control apparatus 200 transmits a Get message of requesting to read the instantaneous input/output value of the DC-AC conversion unit 153 to the power control apparatus 150.

In step S407, according to the reception of the Get message, the power control apparatus 150 transmits a Get Res message of notifying the instantaneous input/output value of the DC-AC conversion unit 153 to the equipment control apparatus 200. Here, it is assumed that the instantaneous input/output value of the DC-AC conversion unit 153 is 4.0 kW as a result of the control of the load 120.

In step S408, the equipment control apparatus 200 transmits a Get message of requesting to read the surplus power of the solar power generation apparatus 130 to the power control apparatus 150.

In step S409, according to the reception of the Get message, the power control apparatus 150 transmits a Get Res message of notifying the surplus power of the solar power generation apparatus 130 to the equipment control apparatus 200. Here, it is assumed that the surplus power of the solar power generation apparatus 130 is decreased to 0.0 kW, that is, there is no surplus power as a result of the control of the load 120.

(Summary of Fourth Embodiment)

As described above, in the fourth embodiment, the communication unit 151 of the power control apparatus 150 notifies the surplus power of the solar power generation apparatus 130 as a property corresponding to the multi DC link class to the equipment control apparatus 200. The communication unit 210 of the equipment control apparatus 200 acquires the surplus power of the solar power generation apparatus 130 from the power control apparatus 150. The control unit 220 of the equipment control apparatus 200 controls the load 120 to consume the surplus power of the solar power generation apparatus 130.

Accordingly, by increasing the consumed power of the load 120, the surplus power is consumed, so that it is possible to perform efficient control without waste.

Fifth Embodiment

Hereinafter, a difference of a fifth embodiment from the first embodiment will be described. The fifth embodiment is the same as the first embodiment in terms of a system configuration.

The power control apparatus 150 may set the load following discharge mode for performing discharging as the operation mode (discharge mode) of the storage battery apparatus 140 so as to follow an increase and decrease of the consumed power of the load 120.

Here, in the case where the equipment control apparatus 200 does not check the discharge mode of the storage battery apparatus 140, when the instantaneous charge/discharge power value of the storage battery apparatus 140 is changed, the equipment control apparatus 200 cannot check whether or not the change is caused by the load following discharge mode. Accordingly, there is a possibility to perform erroneous determination that a problem such as a failure occurs in the storage battery apparatus 140.

(Operations According to Fifth Embodiment)

In the fifth embodiment, the communication unit 151 of the power control apparatus 150 notifies the discharge mode of the storage battery apparatus 140 as a property corresponding to the multi DC link class to the equipment control apparatus 200. The discharge mode includes a load following discharge mode for performing discharging so as to follow the increase and decrease in consumed power of the load 120. The communication unit 210 of the equipment control apparatus 200 acquires the discharge mode of the storage battery apparatus 140 from the power control apparatus 150.

FIG. 8 is a sequence diagram illustrating operations according to the fifth embodiment.

As illustrated in FIG. 8, in step S501, the equipment control apparatus 200 transmits a Get message of requesting to read the instantaneous charge/discharge power value of the storage battery apparatus 140 to the power control apparatus 150. The instantaneous charge/discharge power value is a property corresponding to the storage battery class.

In step S502, according to the reception of the Get message, the power control apparatus 150 transmits a Get Res message of notifying the instantaneous charge/discharge power value of the storage battery apparatus 140 to the equipment control apparatus 200. Here, it is assumed that the instantaneous charge/discharge power value is 3.0 kW.

In step S503, the equipment control apparatus 200 transmits a Get message of requesting to read the instantaneous charge/discharge power value of the storage battery apparatus 140 to the power control apparatus 150.

In step S504, according to the reception of the Get message, the power control apparatus 150 transmits a Get Res message of notifying the instantaneous charge/discharge power value of the storage battery apparatus 140 to the equipment control apparatus 200. Here, it is assumed that the instantaneous charge/discharge power value is decreased to 2.0 kW.

In step S505, the equipment control apparatus 200 transmits a Get message of requesting to read the operation mode (discharge mode) of the storage battery apparatus 140 to the power control apparatus 150. The operation mode (discharge mode) of the storage battery apparatus 140 is a property corresponding to the multi DC link class.

In step S506, according to the reception of the Get message, the power control apparatus 150 transmits a Get Res message of notifying the operation mode (discharge mode) of the storage battery apparatus 140 to the equipment control apparatus 200. Here, it is assumed that the operation mode (discharge mode) of the storage battery apparatus 140 is a load following discharge mode. Accordingly, the equipment control apparatus 200 determines that the decrease in the instantaneous charge/discharge power value of the storage battery apparatus 140 is caused not by a problem such as a failure but by the load following discharge mode.

(Summary of Fifth Embodiment)

As described above, in the fifth embodiment, the communication unit 151 of the power control apparatus 150 notifies the discharge mode of the storage battery apparatus 140 as a property corresponding to the multi DC link class to the equipment control apparatus 200. The discharge mode includes a load following discharge mode for performing discharging so as to follow the increase and decrease in consumed power of the load 120. The communication unit 210 of the equipment control apparatus 200 acquires the discharge mode of the storage battery apparatus 140 from the power control apparatus 150.

Accordingly, even in the case where the instantaneous charge/discharge power value of the storage battery apparatus 140 is changed, the equipment control apparatus 200 can checked whether or not the change is caused by the load following discharge mode.

Sixth Embodiment

Hereinafter, a difference of a sixth embodiment from the first embodiment will be described. The sixth embodiment is the same as the first embodiment in terms of a system configuration.

For example, in the case where power restriction of the DC-AC conversion unit 153 is set by the equipment control apparatus 200, the power control apparatus 150 may set the operation mode (charge mode) of the storage battery apparatus 140 to the surplus charge mode for not performing charging with a grid power but performing charging with a surplus power of the solar power generation apparatus 130. Here, if the equipment control apparatus 200 does not checks the charge mode of the storage battery apparatus 140, even in the case where the surplus power is preferably allowed to be consumed by the load 120, there is a possibility to perform unintended charging.

(Operations According to Sixth Embodiment)

In the sixth embodiment, the communication unit 151 of the power control apparatus 150 notifies the charge mode of the storage battery apparatus 140 as a property corresponding to the multi DC link class to the equipment control apparatus 200. The charge mode includes a surplus charge mode for performing charging with only the surplus power of the solar power generation apparatus 130.

The communication unit 210 of the equipment control apparatus 200 acquires the charge mode of the storage battery apparatus 140 from the power control apparatus 150. In the case where the charge mode of the storage battery apparatus 140 is the surplus charge mode and the surplus power is preferably allowed to be consumed by the load 120, the control unit 220 of the equipment control apparatus 200 determines that, for example, the output value of the power control apparatus 150 is to be increased. Next, the communication unit 210 of the equipment control apparatus 200 transmits a Set message for increasing the output value of the power control apparatus 150 to the power control apparatus 150.

(Summary of Sixth Embodiment)

As described above, in the sixth embodiment, the communication unit 151 of the power control apparatus 150 notifies the charge mode of the storage battery apparatus 140 as a property corresponding to the multi DC link class to the equipment control apparatus 200. The charge mode includes a surplus charge mode for performing charging with only the surplus power of the solar power generation apparatus 130. The communication unit 210 of the equipment control apparatus 200 acquires the charge mode of the storage battery apparatus 140 from the power control apparatus 150.

Accordingly, the equipment control apparatus 200 checks that the charge mode is the surplus charge mode and performs control of increasing the output value of the power control apparatus 150, so that the surplus power can be allowed to be consumed by the load 120.

Other Embodiments

In the above-described fourth embodiment, the case where the surplus power of the solar power generation apparatus 130 is a property corresponding to the multi DC link class is exemplified. However, the surplus power of the solar power generation apparatus 130 may also be a property corresponding to the home solar power generation class.

In the above-described fifth embodiment, the case where the discharge mode of the storage battery apparatus 140 is a property corresponding to the multi DC link class is exemplified. However, the discharge mode of the storage battery apparatus 140 may also be a property corresponding to the storage battery class.

In the above-described sixth embodiment, the case where the charge mode of the storage battery apparatus 140 is a property corresponding to the multi DC link class is exemplified. However, the charge mode of the storage battery apparatus 140 may also be a property corresponding to the storage battery class.

In the above-described embodiments, a house is assumed to be a consumers facility, and the case where the equipment control apparatus 200 is an HEMS is exemplified. However, the equipment control apparatus 200 may be a CEMS (Cluster/Community Energy Management System), a BEMS (Building Energy Management System), an FEMS (Factory Energy Management System), an SEMS (Store Energy Management System), or the like.

In the above-described embodiments, a system in accordance with the ECHONET Lite (registered trademark) is exemplified. However, the system is not limited to a system in accordance with ECHONET Lite (registered trademark); the invention may be applied to systems in accordance with another communication protocol such as ZigBee (registered trademark) or KNX.

In addition, the entire contents of Japanese Application No. 2013-258892 (filed on Dec. 16, 2013) are incorporated into this specification by reference.

INDUSTRIAL APPLICABILITY

According to the embodiments, it is possible to provide a power control apparatus, an equipment control apparatus, and a method capable for performing efficient control in the case of using a combination of a plurality of power supply apparatuses.

The invention claimed is:

1. A power control apparatus which is installed in a consumer's facility and controls power supply from a plurality of power supply apparatuses, comprising:
a conversion unit which is capable of collectively converting DC power output by each of the plurality of power supply apparatuses to AC power; and
a communication unit which communicates with an external equipment control apparatus in accordance with a predetermined communication protocol, wherein
the communication unit notifies the equipment control apparatus of an equipment class of the power control apparatus in addition to notifying the equipment control apparatus of an equipment class of each of the plurality of power supply apparatuses.

2. The power control apparatus according to claim 1, wherein
the plurality of power supply apparatuses include a predetermined power supply apparatus belonging to a predetermined equipment class which is defined so as to output AC power in the predetermined communication protocol,
the communication unit is capable of notifying the equipment control apparatus of an output parameter of the predetermined power supply apparatus as a property corresponding to the predetermined equipment class, and
the communication unit notifies the equipment control apparatus of information indicating that the output parameter should be interpreted as a parameter for DC power.

3. The power control apparatus according to claim 1, wherein
the communication unit notifies the equipment control apparatus of a rated power value of the conversion unit as a property corresponding to the equipment class of the power control apparatus.

4. The power control apparatus according to claim 3, wherein
the rated power value of the conversion unit is smaller than a sum of the rated power values of each of the plurality of power supply apparatuses.

5. The power control apparatus according to claim 3, wherein
the communication unit receives a setting request transmitted from the equipment control apparatus with respect to the notification of the rated power value, and
the setting request includes a power value with respect to at least one of the plurality of power supply apparatuses.

6. The power control apparatus according to claim 1, wherein
the communication unit notifies the equipment control apparatus of an instantaneous input/output value of the conversion unit as a property corresponding to the equipment class of the power control apparatus, and
the instantaneous input/output value is a measured value of the power after conversion in the conversion unit.

7. The power control apparatus according to claim 1, wherein
the plurality of power supply apparatuses include a solar power generation apparatus, and
the communication unit notifies the equipment control apparatus of a surplus power of the solar power generation apparatus as a property corresponding to the equipment class of the power control apparatus or as a property corresponding to the equipment class of the solar power generation apparatus.

8. The power control apparatus according to claim 7, wherein
the plurality of power supply apparatuses include a storage battery apparatus, and
the surplus power is a power which is not consumed by a load and is not charged in the storage battery apparatus among power which can be output by the solar power generation apparatus in a case where reverse flowing to a power grid is not performed.

9. The power control apparatus according to claim 1 wherein
the plurality of power supply apparatuses include a storage battery apparatus,
the communication unit notifies the equipment control apparatus of a discharge mode of the storage battery apparatus as a property corresponding to the equipment class of the power control apparatus or as a property corresponding to the equipment class of the storage battery apparatus, and
the discharge mode includes a load following discharge mode for performing discharging so as to follow an increase and decrease in consumed power of a load.

10. The power control apparatus according to claim 1, wherein
the plurality of power supply apparatuses include a storage battery apparatus and a solar power generation apparatus,
the communication unit notifies the equipment control apparatus of a charge mode of the storage battery apparatus as a property corresponding to the equipment class of the power control apparatus or as a property corresponding to the equipment class of the storage battery apparatus, and
the charge mode is a surplus charge mode for performing charging with only a surplus power of the solar power generation apparatus.

11. An equipment control apparatus which performs control of a power control apparatus which is capable of collectively converting DC power output by each of a plurality of power supply apparatuses to AC power, comprising:
a communication unit which communicates with the power control apparatus in accordance with a predetermined communication protocol; and
a control unit which performs the control through the communication unit, wherein
the communication unit acquires an equipment class of the power control apparatus from the power control apparatus in addition to acquiring an equipment class of each of the plurality of power supply apparatuses from the power control apparatus.

12. The equipment control apparatus according to claim 11, wherein
the plurality of power supply apparatuses include a predetermined power supply apparatus belonging to a predetermined equipment class which is defined so as to output AC power in the predetermined communication protocol,
the communication unit is capable of acquiring an output parameter of the predetermined power supply apparatus as a property corresponding to the predetermined equipment class from the power control apparatus, and
in response to reception of information indicating that the output parameter should be interpreted as a parameter for DC power from the power control apparatus by the communication unit, the control unit interprets the output parameter acquired by the communication unit as a parameter for DC power.

13. The equipment control apparatus according to claim 11, wherein
the plurality of power supply apparatuses include a predetermined power supply apparatus belonging to a predetermined equipment class which is defined so as to output AC power in the predetermined communication protocol,
the communication unit is capable of acquiring an output parameter of the predetermined power supply apparatus as a property corresponding to the predetermined equipment class from the power control apparatus, and
in response to acquisition of the equipment class of the power control apparatus by the communication unit, the control unit interprets the output parameter acquired by the communication unit as a parameter for DC power.

14. The equipment control apparatus according to claim 11, wherein
the communication unit acquires a rated power value of a conversion unit which is installed in the power control apparatus and collectively converts DC power from the plurality of power supply apparatuses to AC power as a property corresponding to the equipment class of the power control apparatus from the power control apparatus,
the plurality of power supply apparatuses include a predetermined power supply apparatus of which a power value is set,
the control unit determines the power value of the predetermined power supply apparatus so as not to exceed the rated power value of the conversion unit, and
the communication unit transmits a setting request of setting the determined power value to the predetermined power supply apparatus, to the power control apparatus.

15. The equipment control apparatus according to claim 11, wherein
the communication unit acquires an instantaneous input/output value of a conversion unit which is installed in the power control apparatus and collectively converts DC power from the plurality of power supply apparatuses to AC power as a property corresponding to the equipment class of the power control apparatus from the power control apparatus, and
the instantaneous input/output value is a measured value of the power after conversion in the conversion unit.

16. The equipment control apparatus according to claim 11, wherein
the plurality of power supply apparatuses includes a solar power generation apparatus,
the communication unit acquires a surplus power of the solar power generation apparatus as a property corresponding to the equipment class of the power control apparatus or a property corresponding to the equipment class of the solar power generation apparatus from the power control apparatus, and
the control unit controls a load so as to consume the surplus power.

17. The equipment control apparatus according to claim 16, wherein
the plurality of power supply apparatuses includes a storage battery apparatus, and
the surplus power is a power which is not consumed by the load and is not charged in the storage battery apparatus among power output by the solar power generation apparatus in a case where reverse flowing to a power grid is not performed.

18. The equipment control apparatus according to claim 11, wherein
the plurality of power supply apparatuses includes a storage battery apparatus,
the communication unit acquires a discharge mode of the storage battery apparatus as a property corresponding to the equipment class of the power control apparatus or a property corresponding to the equipment class of the storage battery apparatus from the power control apparatus, and
the discharge mode includes a load following discharge mode for performing discharging so as to follow an increase and decrease in consumed power of a load.

19. The equipment control apparatus according to claim 11, wherein
the plurality of power supply apparatuses includes a storage battery apparatus and a solar power generation apparatus,
the communication unit acquires a charge mode of the storage battery apparatus as a property corresponding to the equipment class of the power control apparatus or a property corresponding to the equipment class of the storage battery apparatus from the power control apparatus, and the charge mode includes a surplus charge mode for performing charging with only a surplus power of the solar power generation apparatus.

20. A method used for a system including a plurality of power supply apparatuses and a power control apparatus which is capable of collectively converting DC power output by each of the plurality of power supply apparatuses to AC power, the method comprising:

the power control apparatus and an equipment control apparatus communicating with each other in accordance with a predetermined communication protocol; and in the communication, notifying, from the power control apparatus to the equipment control apparatus, an equipment class of the power control apparatus in addition to notifying an equipment class of each of the plurality of power supply apparatuses.

\* \* \* \* \*